United States Patent
Dong et al.

(10) Patent No.: US 10,473,833 B2
(45) Date of Patent: Nov. 12, 2019

(54) LIGHT MODULATION PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ruijun Dong, Beijing (CN); Xue Dong, Beijing (CN); Haiwei Sun, Beijing (CN); Chenru Wang, Beijing (CN); Lili Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 10 days.

(21) Appl. No.: 15/531,697

(22) PCT Filed: Oct. 17, 2016

(86) PCT No.: PCT/CN2016/102260
§ 371 (c)(1),
(2) Date: May 30, 2017

(87) PCT Pub. No.: WO2017/118140
PCT Pub. Date: Jul. 13, 2017

(65) Prior Publication Data
US 2018/0081095 A1    Mar. 22, 2018

(30) Foreign Application Priority Data

Jan. 8, 2016  (CN) .......................... 2016 1 0012900

(51) Int. Cl.
G02B 5/18      (2006.01)
G02B 27/22     (2018.01)
G02B 5/20      (2006.01)

(52) U.S. Cl.
CPC ............. *G02B 5/1842* (2013.01); *G02B 5/18* (2013.01); *G02B 5/1814* (2013.01);
(Continued)

(58) Field of Classification Search
CPC .. G02B 5/1842; G02B 5/1814; G02B 5/1866; G02B 27/2214; G02B 5/18; G02B 5/201;
(Continued)

(56) References Cited

U.S. PATENT DOCUMENTS

2003/0076594 A1* 4/2003 Kramer ................ G02B 5/1866
                                                              359/569
2005/0041174 A1   2/2005 Numata et al.
(Continued)

FOREIGN PATENT DOCUMENTS

CN    202330747 U    7/2012
CN    103293573 A    9/2013
(Continued)

OTHER PUBLICATIONS

International Search Report and Written Opinion in PCT/CN2016/102260 dated Jan. 5, 2017, with English translation.

*Primary Examiner* — Kimberly N. Kakalec
(74) *Attorney, Agent, or Firm* — Womble Bond Dickinson (US) LLP

(57) ABSTRACT

This disclosure relates to a light modulation panel and a display device. The light modulation panel comprises: a color separation grating plate having a plurality of light-transmissive microstructures; a reception substrate located on a light exit side of the color separation grating plate and spaced away from the color separation grating plate; and an
(Continued)

optical waveguide layer located on a light exit side of the reception substrate. According to technical solutions of this disclosure, the optical waveguide layer can modulate the exit light into collimated light. As a result, cross-color phenomenons of the display device can be effectively improved, and thereby the display quality is enhanced. In addition, by adjusting a structure of the optical waveguide layer, the exit light can also be emitted out at a preset angle such that the display device can be applied in occasions such as 2D display, 3D display or privacy protection.

7 Claims, 2 Drawing Sheets

(52) U.S. Cl.
CPC ....... *G02B 5/1866* (2013.01); *G02B 27/2214* (2013.01); *G02B 5/201* (2013.01)

(58) Field of Classification Search
CPC ............ G02B 27/4233; G02B 27/4205; G02B 27/425
See application file for complete search history.

(56) References Cited

U.S. PATENT DOCUMENTS

| 2007/0268426 | A1* | 11/2007 | Jung | G02B 6/005 349/62 |
| 2011/0141412 | A1 | 6/2011 | Lee et al. | |
| 2011/0216266 | A1* | 9/2011 | Travis | F21V 7/22 349/62 |
| 2013/0257708 | A1 | 10/2013 | Wang | |
| 2015/0124198 | A1 | 5/2015 | Sun et al. | |

FOREIGN PATENT DOCUMENTS

| CN | 103365021 A | 10/2013 |
| CN | 205318031 U | 6/2016 |

* cited by examiner

LIGHT MODULATION PANEL AND DISPLAY DEVICE

The present application is the U.S. national phase entry of PCT/CN2016/102260, with an international filling date of Oct. 17, 2016, which claims the benefit of Chinese Patent Application No. 201610012900.7, filed on Jan. 8, 2016, the entire disclosures of which are incorporated herein by reference.

FIELD

This disclosure relates to the field of display technologies, and in particular to a light modulation panel and a display device.

BACKGROUND ART

A thin film transistor liquid crystal display (TFT-LCD) usually comprises a liquid crystal panel and a backlight module for providing backlight to the liquid crystal panel. Specifically, the liquid crystal panel comprises an array substrate and a color filter substrate aligned with each other, as well as a liquid crystal layer located between the array substrate and the color filter substrate. The color filter substrate is provided with color resin and a black matrix. The color resin filters light transmitted through the liquid crystal layer, and thus generates light rays of three primary colors: red, green and blue. Such light rays of three primary colors: red, green and blue are mixed in different proportions, thereby exhibiting various colors and enabling full color display of the TFT-LCD. The black matrix shields stray light by a light-shielding region, and thus avoids light leakage between a periphery of a display region and pixels. Since light rays will be subjected to a light loss of up to 70% when impinging on the color resin, a conventional TFT-LCD has low light utilization efficiency.

SUMMARY

It is an objective of embodiments of this disclosure to provide a light modulation panel and a display device, for improving low light utilization efficiency of the display device and possible cross color phenomenon, thereby enhancing the display quality and enriching application occasions thereof.

An embodiment of this disclosure provides a light modulation panel. The light modulation panel comprises: a color separation grating plate having a plurality of light-transmissive microstructures; a reception substrate located on a light exit side of the color separation grating plate and spaced away from the color separation grating plate; and an optical waveguide layer located on a light exit side of the reception substrate.

In the light modulation panel according to the embodiment of this disclosure, an optical waveguide layer is arranged on a light exit side of the reception substrate. Such an optical waveguide layer can adjust an angle of exit light such that the exit light can be collimated light. In this way, the low light utilization efficiency of the display device and the possible cross color phenomenon can be effectively improved, and the display quality can also be enhanced. Besides, by adjusting the structure of the optical waveguide layer, the exit light can also be emitted out at a preset angle, such that the display device can be applied in occasions such as 3D display or privacy protection.

According to a specific embodiment, the optical waveguide layer comprises at least ten layers of transparent dielectric, and refractive indexes of the at least ten layers of transparent dielectric gradually increase in a light exit direction of the light modulation panel. In this way, an angle of the exit light can be controlled accurately, and thus the display quality of the display device can be further enhanced.

According to a specific embodiment, the at least ten layers of transparent dielectric are made of different materials. Alternatively, the at least ten layers of transparent dielectric are made of a same material with different densities. Further alternatively, each layer of transparent dielectric comprises a base layer and dopant particles, and the base layers of the at least ten layers transparent dielectric are made of a same material while the dopant particles thereof have different densities.

According to a specific embodiment, the reception substrate and the color separation grating plate are spaced away by a sealant.

An embodiment of this disclosure further provides a display device comprising the light modulation panel according to any of the above technical solutions. As compared with an existing approach, the light exit direction of the display device can be controlled accurately, which improves the low light utilization efficiency and the possible cross color phenomenon, thus achieving a better display quality.

According to a specific embodiment, the display device as mentioned above comprises a 2D display device, a 3D display device or a privacy protection display device. By adjusting the structure of the optical waveguide layer, the exit light can be emitted out at a preset angle, such that the display device can be applied in occasions such as 2D display, 3D display or privacy protection.

DETAILED DESCRIPTION OF EMBODIMENTS

In order to improve light utilization efficiency of display devices and possible cross color phenomenon, and further enhance display quality and enrich application occasions thereof, an embodiment of this disclosure provides a light modulation panel and a display device. In order to render the objective of this disclosure, the technical solutions and the advantages thereof clearer, this disclosure will be further illustrated below in detail by way of specific embodiments.

The light modulation panel provided in an embodiment of this disclosure can be applied to a 2D display device, a 3D display device or a privacy protection display device. Specifically, a light modulation panel applied to a 2D display device will be illustrated.

Further specifically, in each drawing provided as examples, the following reference signs are used to indicate various specific components according to the embodiment of this disclosure, respectively: 10—light modulation panel; 11—color separation grating plate; 12—light-transmissive microstructure; 13—reception substrate; and 14—optical waveguide layer.

Inventors of this disclosure have realized that light colors can be separated by a diffractive color separation plate. Specifically, the diffractive color separation plate can comprise a color separation grating plate and a reception substrate spaced away from each other. According to a specific embodiment, the color separation grating plate comprises light-transmissive microstructures having different widths and heights. When incident white light is emitted out after passing through the light-transmissive structures with different heights, a phase difference can be formed and thereby monochromatic light rays can be separated out. After that, such different monochromatic light rays will be diffracted by the grating, thereby forming separate monochromatic displays on the reception substrate. However, for such a structure, since directions of light rays emitted out after passing through the diffractive color separation plate are disordered, cross color phenomenons may also occur, which decreases the display quality of the display device.

Figure 1:
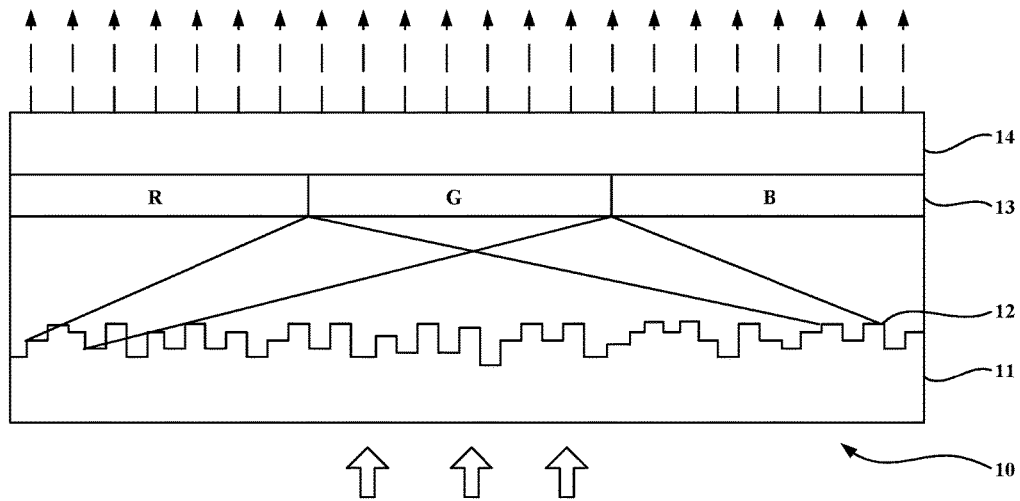
FIG. 1 is a schematic sectional structure view of a light modulation panel according to an embodiment of this disclosure.

Referring to FIG. 1, a light modulation panel 10 according to an embodiment of this disclosure is shown. The light modulation panel 10 comprises: a color separation grating plate 11 having a plurality of light-transmissive microstructures 12; a reception substrate 13 located on a light exit side of the color separation grating plate 11 and spaced away from the color separation grating plate 11; and an optical waveguide layer 14 located on a light exit side of the reception substrate 13.

As can be easily understood by those skilled in the art, a term such as "a light exit side" or "a light exit direction" used in the embodiment of this disclosure can be construed as a side closer to the viewer. Here, the side or direction closer to the viewer can also be alternatively referred to as "a front side" or "a front direction".

In the technical solution of the embodiment of this disclosure, the color separation grating plate 11 of the light modulation panel 10 comprises a plurality of light-transmissive microstructures 12 having different widths and heights. Accordingly, when incident white light is emitted out after passing through the light-transmissive structures 12 with different heights, a phase difference can be formed and thereby monochromatic light rays can be separated out. After that, such different monochromatic light rays will be diffracted by the grating, thereby forming separate monochromatic displays on the reception substrate 13. The light modulation panel 10 is provided with an optical waveguide layer 14 on a front side surface of the reception substrate 13. Such an optical waveguide layer 14 can adjust an angle of the exit light. Therefore, as compared with an existing approach, with the light modulation panel according to the embodiment of this disclosure, the exit light can be collimated light. This effectively improves the light utilization efficiency of the display device and the possible cross color phenomenon, and thus enhances the display quality. Besides, by adjusting the structure of the optical waveguide layer 14, the exit light can also be emitted out at a preset angle, such that the display device can be applied in occasions such as 3D display or privacy protection.

It is worth mentioning that for the collimated light as mentioned in the embodiment of this disclosure, the light rays are not necessarily absolutely perpendicular to the screen. Oppositely, an angle between the light rays and the screen can have certain error range. For example, the angle enclosed between the screen and the collimated light emitted by the display module is $90°\pm\alpha$, wherein $\alpha$ is a set error angle.

Figure 2:
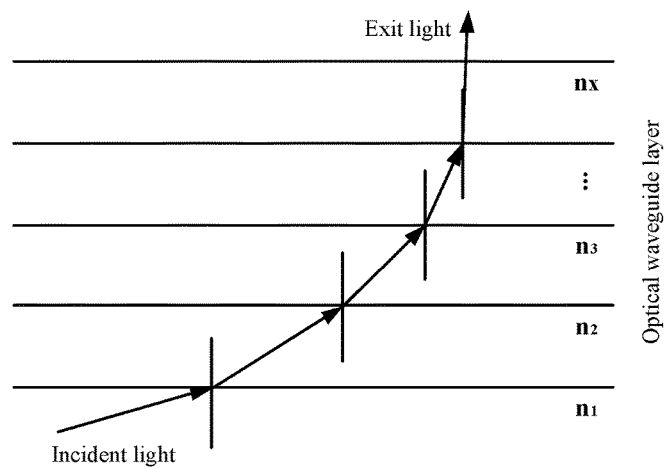
FIG. 2 is a schematic structure view of an optical waveguide layer according to an embodiment of this disclosure.

As shown in FIG. 2, in an optional embodiment of this disclosure, the optical waveguide layer 14 comprises at least ten layers of transparent dielectric. Refractive indexes of the at least ten layers of transparent dielectric gradually increase from back to front, i.e., in a light exit direction of the light modulation panel. In other words, from back to front, the refractive index of each layer of transparent dielectric satisfies: $n1<n2<\ldots<nx$. In this way, the propagation of light will be confined to the optical waveguide layer and a limited region surrounding it. Therefore, an angle of exit light can be accurately controlled, and the display quality of the display device can be further enhanced.

Optionally, the at least ten layers of transparent dielectric are made of different materials. Further optionally, the at least ten layers of transparent dielectric are made of a same material with different densities. Still further alternatively, each layer of transparent dielectric comprises a base layer and dopant particles, and the base layers of the at least ten layers of transparent dielectric are made of a same material, while the dopant particles thereof have different densities.

As shown in FIG. 1, in an optional embodiment disclosed in this disclosure, the reception substrate 13 and the color separation grating plate 11 are spaced away by a sealant.

An embodiment of this disclosure further provides a display device comprising the light modulation panel according to any of the above embodiments. As compared with an existing approach, the light exit direction of the display device can be controlled accurately, which improves the light utilization efficiency of the display device and the possible cross color phenomenon, thus achieving a better display quality.

Optionally, the display device can comprise a 2D display device, a 3D display device or a privacy protection display device. By adjusting the structure of the optical waveguide layer, the exit light can be emitted out at a preset angle, such that the display device can be applied in occasions such as 2D display, 3D display or privacy protection.

Figure 3:
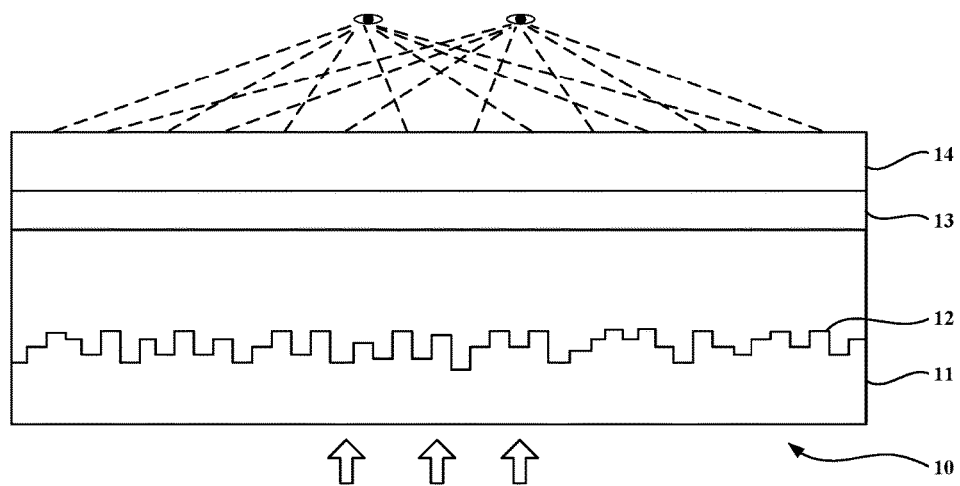
FIG. 3 is a schematic sectional structure view of a light modulation panel according to an embodiment of this disclosure when applied to a 3D display device.

For example, as shown in FIG. 3, when the light modulation panel 10 is applied to a 3D display device, the light rays will be modulated into left eye light and right eye light emitting towards a left eye viewing zone and a right eye viewing zone of the viewer respectively, after passing through the optical waveguide layer 14 with a particular structure. Accordingly, a 3D display is realized.

Figure 4:
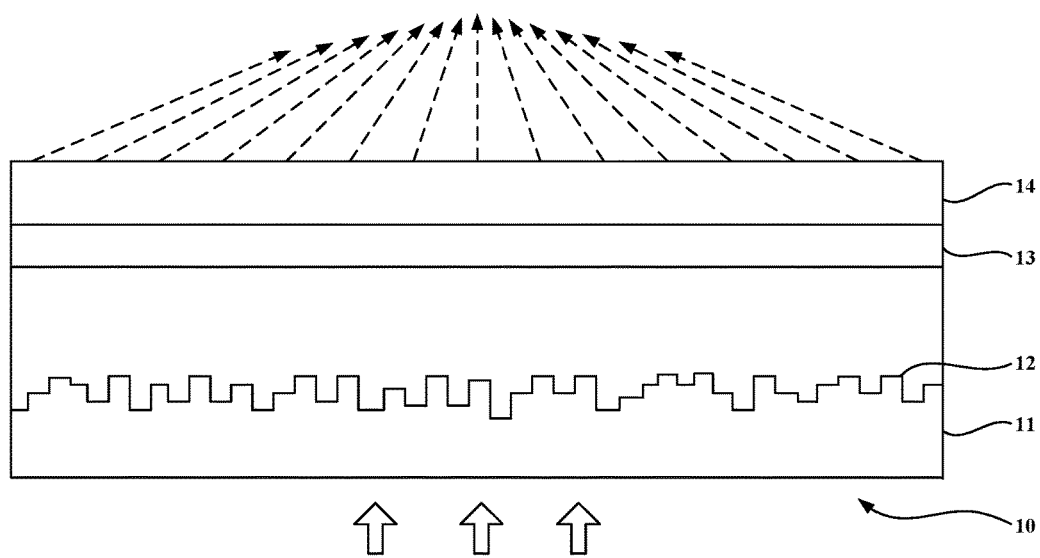
FIG. 4 is a schematic sectional structure view of a light modulation panel according to an embodiment of this disclosure when applied to a privacy protection display device.

As another example, as shown in FIG. 4, when the light modulation panel 10 is applied to a privacy protection display device, the light rays will be modulated into light rays with a quite small viewing angle, after passing through the optical waveguide layer 14 with a particular structure. Accordingly, only the viewer in front of the screen can see the image display, while peepers in other positions cannot.

To sum up, with the technical solutions of the embodiment of this disclosure, the light utilization efficiency of the display device and the possible cross color phenomenon can be improved, thereby enhancing the display quality. Meanwhile, by adjusting the structure of the optical waveguide layer, the exit light can be emitted out at a preset angle, such that the light modulation panel can be applied in occasions such as 2D display, 3D display or privacy protection.

Obviously, those skilled in the art can make various modifications and variations to this disclosure without deviating from spirits and scopes of it. Thus, if these modifications and variations to this disclosure fall within the scopes of the appended claims and the equivalent techniques thereof, this disclosure is intended to include them too.

The invention claimed is:

1. A display device, comprising: a backlight unit, and a light modulation panel located on a light exit side of the backlight unit, wherein the light modulation panel comprises:
    a color separation grating plate having a plurality of light-transmissive microstructures;
    a reception substrate located on a light exit side of the color separation grating plate and spaced away from the color separation grating plate; and
    an optical waveguide layer located on a light exit side of the reception substrate, wherein,
    the light modulation panel further comprises a transparent material filled between the color separation grating plate and the reception substrate, so that a distance between a surface of the color separation grating plate away from the optical waveguide layer and a surface of the reception substrate adjacent to the optical waveguide layer keeps the same across the light modulation panel.

2. The display device according to claim 1, comprising a 2D display device, a 3D display device or a privacy protection display device.

3. The display device according to claim 1, wherein
    the optical waveguide layer comprises at least ten layers of transparent dielectric, and
    refractive indexes of the at least ten layers of transparent dielectric gradually increase in a light exit direction of the light modulation panel.

4. The display device according to claim 3, wherein
    the at least ten layers of transparent dielectric are made of different materials.

5. The display device according to claim 3, wherein
    the at least ten layers of transparent dielectric are made of a same material with different densities.

6. The display device according to claim 3, wherein
    each layer of transparent dielectric comprises a base layer and dopant particles, and the base layers of the at least ten layers transparent dielectric are made of a same material while the dopant particles thereof have different densities.

7. The display device according to claim 1, wherein the reception substrate and the color separation grating plate are spaced away by a sealant.

* * * * *